United States Patent Office 3,450,970
Patented June 17, 1969

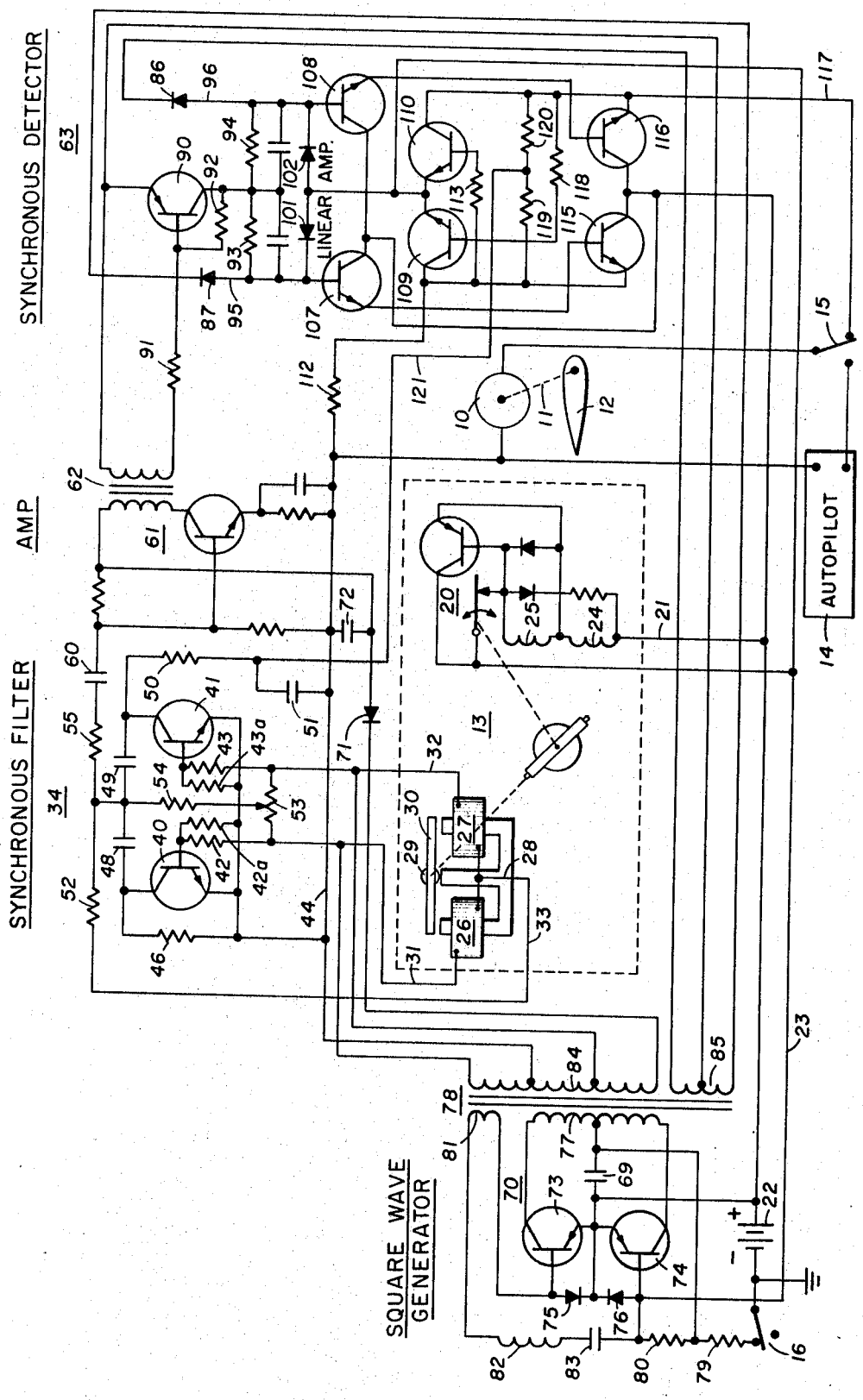

3,450,970
FLIGHT CONTROL SYSTEM HAVING RATE-BASED STABILIZATION
James R. Younkin, Mineral Wells, Tex., assignor to Thurman & Younkin, Inc., a corporation of Texas
Filed Mar. 11, 1966, Ser. No. 533,702
Int. Cl. H02p 5/46, 7/68, 7/74
U.S. Cl. 318—18                    7 Claims

ABSTRACT OF THE DISCLOSURE

The disclosure is directed to a flight control system for an aircraft including a rate gyro which generates signals indicative of a roll rate and azimuth rate of the aircraft. An amplifying channel couples the output of the rate gyro to a servo actuator which controls the positions of ailerons of the aircraft. The amplifying channel is preferably unstable and oscillatory to maintain the system properly responsive to signals representative of minute deviation rates. A time delay feedback loop is provided to couple a delayed servo drive signal from the input of the actuator back into the amplifying signal channel to match the servo drive signal to the servo actuator.

---

This invention relates to flight control, and more particularly to the automatic stabilization of an aircraft during flight in response to the rate of change of attitude relative to the vertical and roll axes.

In a more specific aspect, the system preferably involves an unstable drive for a servo actuator to maintain the system promptly responsive to signals representative of minute deviation rates.

It has been found desirable to relieve a pilot of much of the effort required to maintain an aircraft on a desired course. Turbulent air generally requires constant adjustment of controls in order to maintain the desired course. Flight stabilizers which automatically control an aircraft have heretofore been known and which, in a measure, provide the desired result.

The present invention is directed to an improved and highly simplified flight stabilizer in which a servo actuator for control of aircraft ailerons is made to be responsive to signals from a tilted rate gyro. The rate signals are treated in an amplifying system which preferably is unstable and thus oscillatory, thereby to maintain the actuator sensitive and responsive to minute rate-dependent signals.

More particularly, the invention is directed to a combination of elements forming a flight stabilizer for the control of aileron position, and includes a tilted rate gyro mounted on the aircraft equally to respond to changes in azimuth and roll. A signal channel is provided for coupling the rate signals to an actuator, and has means for additionally applying low frequency oscillator signals to the actuator to eliminate static friction so that the actuator will be responsive to minute rate signals from the gyro. Means are provided for matching the signal channel to the actuator to eliminate the need for aileron follow-up elements.

For a more complete understanding of the present invention and for further objects and advantages thereof, reference may now be had to the following description taken in conjunction with the accompanying drawings in which:

FIGURE 1 is a schematic diagram of a system embodying the present invention.

SYSTEM

In FIGURE 1, a system is illustrated wherein a servo actuator 10 is coupled by linkage 11 to aileron 12. The servo actuator 10 is driven in response to signals derived from a rate gyro 13. The system may be operated in conjunction with an autopilot 14 which also provides for controlled drive of the actuator 10. Control means represented by switch 15 is provided so that when the autopilot 14 is placed in service, the servo actuator 10 will be switched from the output of the stabilizer circuit to the output of the autopilot. Further, when the stabilizer is in service, it may be removed from control of the aircraft by actuating switch 16, preferably actuated by a control button located on the control wheel.

RATE GYRO

The rate gyro includes an oscillator circuit 20 which is energized by way of line 21 leading from the positive terminal of a battery 22. The negative terminal of battery 22 is connected to ground and to a return line 23 by way of an oscillator circuit. The rate gyro oscillator 20 includes coils 24 and 25 which serve to drive a gyro rotor. The rotor is cradled and mounted as to be responsive to movements around the vertical and roll axes of the aircraft and serves to unbalance a rate pick-off circuit including coils 26 and 27 which are in the form of spools mounted on an E-core 28. The rate gyro rotor is mounted in a cage which is pivoted on the axis of shaft 29 which carries armature 30. The air gaps between the armature 30 and the core 28 are varied so that the signals appearing on the output lines 31 and 32 will be balanced relative to common line 33 when there is no rate signal, and will be unbalanced in one direction or the other depending upon the unbalance in the gyro 13. The gyro 13 and its drive circuit and structure preferably will be of the type manufactured and sold by Mitchell Industries, Inc., of Mineral Wells, Tex., and identified as Mitchell Rate Gyro, described and claimed in U.S. Patent No. 3,324,773.

SYNCHRONOUS FILTER

The output signals from the rate gyro are applied by way of lines 31, 32 and 33 to the synchronous filter 34. Synchronous filter 34 includes a pair of transistors 40 and 41, having their bases connected by way of resistors 42 and 43 to conductors 31 and 32, respectively. The emitters of transistors 40 and 41 are connected together and to a common bus 44. A resistor 46 is connected between the emitter and collector terminals of transistor 40. The latter collector terminal is connected by way of series condensers 48 and 49 to the collector of transistor 41. The collector of transistor 41 is connected by way of resistor 50 and condenser 51 to bus 44. The juncture between resistor 50 and condenser 51 is the injection point for a feedback signal from the output of the power amplifier driving the servo actuator 10, as will later be described.

The common line 33 from the rate gyro is connected by way of resistor 52 to the juncture between condensers 48 and 49. A potentiometer 53 is connected across lines 31 and 32 leading from coils 26 and 27. The variable tap on the potentiometer 53 is connected by way of resistor 54 to the juncture between condensers 48 and 49.

The output of filter 34 is transmitted by way of resistor 55 and condenser 60 to the base of a transistor amplifier 61. The output of the amplifier 61 is coupled by way of transformer 62 to a synchronous detector 63.

EXCITATION

The synchronous filter 34 and the amplifier 61 are supplied with operating voltages from a power supply including an oscillator 70, rectifier 71, and filter condenser 72. The oscillator 70 also supplies square wave switching signals to the synchronous filter 34.

The oscillator 70 includes a pair of transistors 73 and 74 which have their emitters connected together to one terminal of a condenser 69 and to the midpoint between a pair of oppositely poled diodes 75 and 76. Diode 75 is connected at its other terminal to the base of transistor 73. Diode 76 is connected at its other terminal to the base of transistor 74. The collectors of transistors 73 and 74 are connected to the extremities of a primary winding 77 of an output transformer 78. The center tap of winding 77 is connected to condenser 69; by way of resistor 79 and switch 16 to the negative terminal of battery 22; and by way of resistor 80 to the base of transistor 74. The winding 81 on transformer 78 is connected at one extremity to the base of transistor 73 and, by way of an inductance 82 and condenser 83, to the base of transistor 74. The latter circuit is a low impedance resonant circuit which serves to tune the oscillator to the desired frequency, preferably in the audio range. Secondary winding 84 has the upper extremity connected to conductor 31. The second tap on winding 84 is connected to the common bus 44; the third tap is connected to conductor 32; and the bottom tap is connected to the rectifier 71. The transformer circuit which includes lines 31 and 32 applies square wave switching voltages to the synchronous filter 34. A fourth winding 85 is provided on transformer 78 and has a center tap connected to the upper terminal of the secondary winding of isolation transformer 62. The upper and lower terminals of winding 85 are connected to diodes 86 and 87, respectively, at the input terminals to the synchronous detector 63.

SYNCHRONOUS DETECTOR

The synchronous detector 63 includes a transistor 90 connected at its base by way of resistor 91 to the lower terminal of the secondary winding of transformer 62. The upper terminal of the latter winding is connected to the emitter of transistor 90. The collector is connected to the base by way of resistor 92 and to the midpoint between a pair of RC networks 93 and 94 which extend from the collector of transistor 90 to lines 95 and 96, respectively, leading from diodes 87 and 88, respectively. Diode clamps, including diodes 101 and 102, are connected across lines 95 and 96. Lines 95 and 96 extend to the bases of transistors 107 and 108, respectively, which drive a switch circuit. The collectors of transistor 107 and 108 are connected together and to the positive terminal of battery 22.

SWITCH CIRCUIT

The common juncture between diodes 101 and 102 is connected to the emitters of switch transistors 109 and 110, as well as to the B+ terminal of the battery 22.

The collector of transistor 109 is connected by way of resistor 112 to the common bus 44, by way of resistor 113, to the base of transistor 110 and to the emitter of transistor 115. The collector of transistor 110 is connected to the emitter of transistor 116 and, by way of line 117, to one terminal of the switch 15 for driving servo actuator 10. Resistor 118 connects the collector of transistor 110 to the base of transistor 109. Resistors 119 and 120 are connected in series between the collectors of transistors 109 and 110. The juncture between resistors 119 and 120 is connected by way of line 121 to the feedback injection point between resistor 50 and condenser 51. The collectors of transistors 115 and 116 are connected together and to the bus 23.

In the system thus far described, the rate gyro 13 is mounted on the air frame tilted at an angle of 45° so that it samples equally changes in azimuth and roll. It is insensitive to pitch. It is mounted and so connected in the circuit such that a right turn and roll to the right produce the same effect. Any high performance rate gyro may thus be employed. In the present system, the square wave generator produced an output signal at about 5,000 cycles per second. The actuator 10 was an integrating type servo in which the drive system for the servo is unstable, thus introducing a low frequency oscillation of the order of 18 cycles per second to maintain the servo actuator 10 free from static friction. Thus, the system has substantially zero threshold and is responsive to very slight rate signals. In operation, the square wave generator 70 applies a square wave voltage to the coils 26 and 27. If the gyro 13 is balanced there will be no signal applied to the synchronous filter 34. When an unbalanced signal is present during one-half cycle the net effect of the unbalanced signal will be averaged and stored on condenser 48. During the other half of the cycle the net effect of the signal is averaged and stored on condenser 49 so that a square wave voltage is produced at the output of the filter.

Transistors 40 and 41 act as open switches when their respective bases are more positive than their collectors and as close switches regardless of collector polarity when adequate negative drive is applied to the base.

The square wave signal from the synchronous filter 34 is amplified in amplifier 61 and applied by way of transformer 62 to the synchronous detector 63. The square wave signal from transformer winding 85 is applied to the synchronous filter by way of diodes 86 and 87 in phase opposition (push-pull). When the voltages from winding 85 in the opposite halves of the winding are of opposite polarity rectification will take place on opposite half cycles, however, current will pass only if conduction can take place through the center branch of the network, which is controlled by transistor 90. In the absence of a signal applied to the base of transistor 90, conduction will be determined by the bias resistor 92. Absent a signal from amplifier 61, rectifier voltages in each RC network (93 and 94) will be equal. However, if a control signal is applied to the base of transistor 90 so that it is negative when the voltage in the top half of winding 85 is negative, current flow through resistor 94 will be greater than through resistor 93 and the output voltage will be negative when measured from the base of transistor 107 to the base of transistor 108. Increasing the amplitude of the signal from amplifier 61 will increase the voltage applied to transistor 107 and 108. Reversal of the phase of the polarity of the output voltage from amplifier 61 will reverse the polarity of the voltage applied to transistors 107 and 108.

When there is no input signal, i.e., the voltage between the bases of transistors 107 and 108 is zero, transistors 107, 108, 115 and 116 are cut off and both terminals of motor 10 are almost at ground potential.

The voltage across the terminals of the motor 10 is derived from the extremities of resistors 119 and 120. When the base of transistor 107 is positive with respect to the base of transistor 108, conduction through diode 102 prevents the base of transistor 108 from going negative with respect to ground, while the base of transistor 107 goes positive. As the base of transistor 107 goes positive, signal action through transistors 107 and 115 causes the collector of transistor 115 and, thus, the left terminal of motor 10, to go positive. At the same time, current through resistor 113 to the base of transistor 110 causes transistor 110 to hold the right hand terminal of motor 10 at ground level. Transistors 109 and 110 act as switches in that they conduct with practically no voltage drop or else they are completely nonconductive. When the base of transistor 107 is positive, the left terminal of motor 10 is positive and the converse is true regarding the condition when the base of transistor 108 is positive. The diodes 101 and 102 prevent the bases of either transistor 107 or 108 from going negative since they act as signal clamping diodes. The purpose of the synchronous filter is to translate the poor signal wave form produced by the gyro 13 into a perfect square wave to obtain a rate signal, this square wave is then applied to the summing input terminal of a high gain negative feedback amplifier loop, including amplifier 61 and the amplifier having as its input stages transistors 107 and 108. The feedback network of this amplifier involving the line 121 and the delay network 50–50 introduces a time delay. When this delayed feedback signal is subtracted from the position signal at the summing point, the difference is a signal that corresponds to the rate of change of attitude. More particularly, the delay permits the output of the high gain amplifier 107, 108 to the transmitting through the synchronous filter 34 almost completely to subtract or cancel out the input signal. Thus, the only time a signal will appear at the output of the summing point is when time has not allowed it to be cancelled by action of the negative feedback system.

The signal channel itself is, with the parameters set out below, unstable to be oscillatory at low frequencies, preferably about 18 cycles per second, while handling signals generated by the rate gyro 13.

In the system above described, the following circuit parameters were employed:

| | |
|---|---|
| Battery 22 | 14 volts. |
| Transistors 40, 41 | NPN Type SM 2140. |
| Resistors 42, 43 | 2.7K. |
| Resistors 42a, 43a | 22K. |
| Condensers 48, 49 | 0.22 microfarads. |
| Resistors 52, 54 | 1 megohm. |
| Potentiometer 53 | 10K. |
| Resistor 50 | 10K. |
| Condenser 51 | 5 microfarads. |
| Resistors 113, 118 | 68 ohms. |
| Resistor 119 | 100 ohms. |
| Resistor 120 | 1,000 ohms. |
| Resistors 112 | 0.47 ohms. |

With a system constructed as above noted, the stabilizer provided for smooth flight even though the system is relatively simple.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an aircraft wherein a servo actuator controls the position of ailerons, a flight stabilizer which comprises:
   (a) a rate gyro for producing rate signals indicative of the roll rate and azimuth rate of said aircraft,
   (b) a signal channel for coupling said rate signals to said actuator to oppose roll and having means in said signal channel to apply low frequency oscillatory signals to said actuator to maintain said actuator free from static friction and responsive to minute rate signals from said gyro, and
   (c) a time delay feedback loop for coupling a delayed servo drive signal from the input of said atcuator back into said signal channel to match said drive signal to said actuator.

2. The combination set forth in claim 1 wherein said signal channel itself is oscillatory at low frequencies to generate said low frequency signals while passing said rate signals.

3. The combination set forth in claim 1 in which an oscillator applies low frequency signals to said channel.

4. The combination set forth in claim 1 wherein means are provided for producing a rate gyro output signal having a frequency of about 5,000 cycles per second and means are provided for control of said low frequency signals at a frequency of about 18 cycles per second.

5. The combination set forth in claim 1 wherein means are provided for producing a rate gyro output signal having a frequency of about 5,000 cycles per second and wherein the signal channel is oscillatory to generate signals internally at about 18 cycles per second.

6. The combination set forth in claim 1 in which the rate gyro is tilted at an angle of 45° with respect to two major axes of the aircraft for equally sampling roll rate and rate of change in azimuth.

7. In an aircraft wherein a servo actuator controls the position of ailerons, a flight stabilizer which comprises:
   (a) a rate gyro for producing rate signals indicative of the roll rate and azimuth rate of said aircraft,
   (b) a signal channel including a synchronous filter, an amplifier, a synchronous detector, and a reversing switch connected in series for coupling said rate signals to said actuator to oppose roll and having means to apply low frequency oscillatory signals to said actuator to maintain said actuator free from static friction and responsive to minute rate signals from said gyro, and
   (c) a time delay feedback loop for coupling a delayed servo drive signal which is representative of the energization voltage applied to said actuator back into said signal channel to match said drive signal to said actuator.

References Cited

UNITED STATES PATENTS

| 2,688,112 | 8/1954 | Wimberly | 318—28 |
| 3,241,016 | 19/1966 | Wattson | 318—18 |

BENJAMIN DOBECK, *Primary Examiner.*

U.S. Cl. X.R.

318—28